Dec. 5, 1967  L. E. DAY  3,355,964
TRACTOR SPEED-OF-SHIFT REGULATING MECHANISM
Filed Sept. 30, 1965
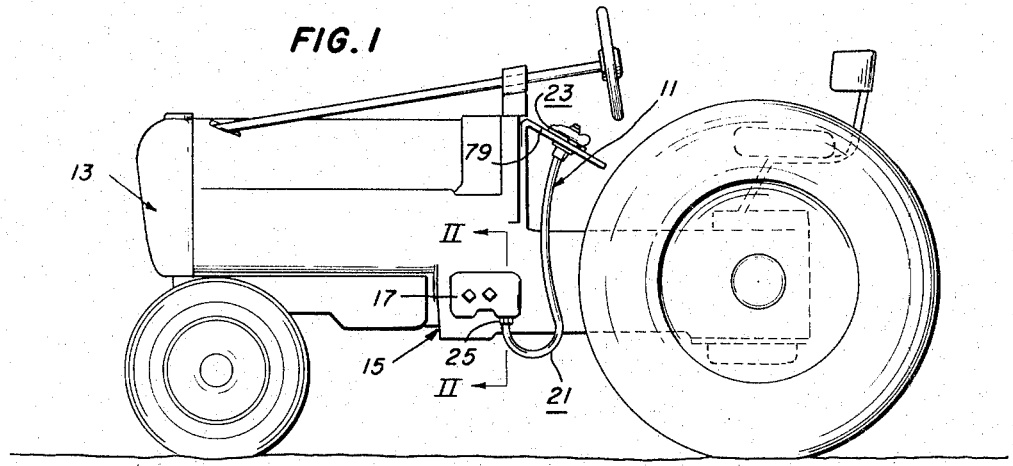
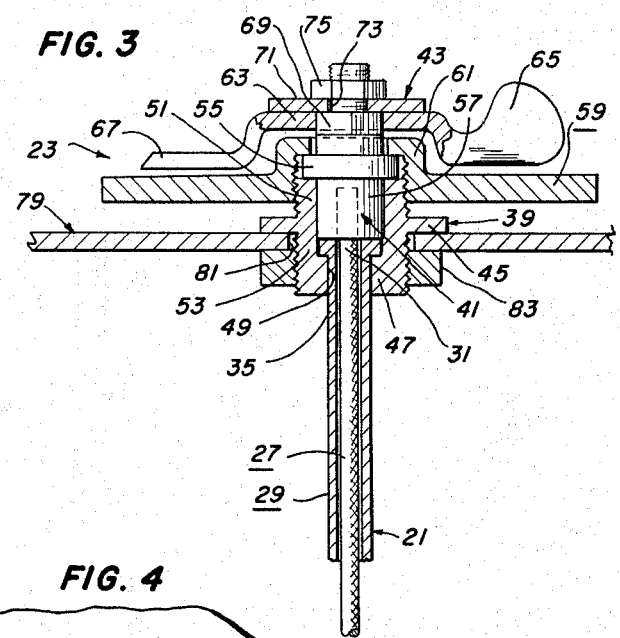
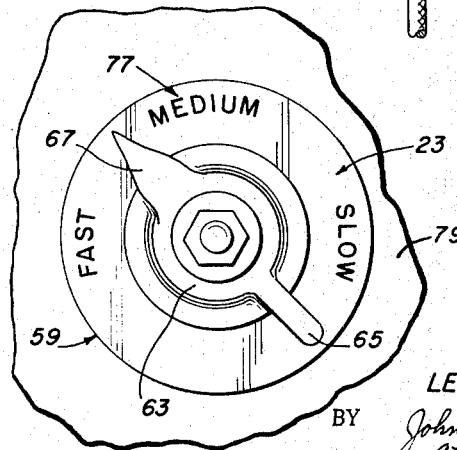
INVENTOR.
LEON E. DAY
BY John R. Walker, III
Attorney

United States Patent Office 3,355,964
Patented Dec. 5, 1967

3,355,964
TRACTOR SPEED-OF-SHIFT REGULATING MECHANISM
Leon E. Day, West Memphis, Ark., assignor of fifty percent to Ray H. Pulliam, West Memphis, Ark.
Filed Sept. 30, 1965, Ser. No. 491,747
4 Claims. (Cl. 74—504)

ABSTRACT OF THE DISCLOSURE

For use in a farm type tractor having hydraulically operable transmission means including manually settable shift speed adjusting screw means—the mechanism for accurately turnably manipulating the shift speed adjusting screw by handle means arranged adjacent the tractor operator. The invention including flexible cable and housing remote control means whereby the operator may accurately regulate the speed of shift of the tractor transmission to correspond with the tractive effort expended by the tractor or the load being drawn by the tractor.

---

The invention relates particularly to such shift speed regulating mechanism usable in farm type tractors having hydraulically operable transmission means, as for example, such a tractor as the John Deere farm tractor, Model No. 4010 or 4020.

The typical farm tractor is used in performing many different kinds of work requiring a wide range of tractor power. When a tractor is used in pulling a light load, as for instance in pulling a planter or mowing machine, only a small amount of the available tractor power is used; conversely, when the tractor is used in pulling a heavy load, as for instance in pulling a multi-gang plow or a disc harrow, the tractor may operate at near peak capacity. When pulling a light load, and when shifting from one speed to a higher speed, it is desirable to have a substantially slow, smooth shifting action; conversely, when pulling a heavy load, it is desirable to have a substantially quick and positive shifting action. The rate of shift should be that rate commensurate with the tractor load and also the forward travel of the tractor. A light load may be moved or pulled faster than a heavy load, and since a light fast-moving load has considerable momentum, more time is allowed in effecting a smooth shift; a heavily loaded, slow-moving tractor having only slight forward momentum, however, must be shifted rapidly to prevent the tractor from halting as the shift is being made.

Farm tractors of the above-mentioned type are provided with a shift-adjusting screw in a shift valve housing, and the operator, by turnably manipulating the screw may adjust or regulate the shifting speed of the tractor. The shift adjusting screw is typically recess-mounted in a socket aperture. A hollow screw plug is removably threaded in the aperture and covers the shift adjusting screw.

Heretofore, when it was desirable to change the speed-of-shift of a farm tractor, the operator would dismount from the tractor, remove the screw plug from the housing, adjust the shift speed adjusting screw, replace the screw plug, re-mount the tractor, and then work-try the tractor to determine if the adjustment was correct. This procedure would often need be carried out several times before a correct setting was obtained.

The primary object of the present invention is to provide a speed-of-shift regulator mechanism incorporated in a tractor, whereby the tractor operator may quickly, easily and accurately regulate the shifting speed of the tractor while in operation and without dismounting from the tractor seat.

A further object is to provide a speed-of-shift regulator mechanism whereby the operator of the tractor may readily obtain a rapid or a slow shifting speed by turnably manipulating a handle disposed adjacent the operator.

A further object is to provide such a shift speed regulator mechanism that may be incorporated as original equipment in a new tractor or installed on a used machine.

A further object is to provide a shifter speed regulator mechanism of substantially simple design and a mechanism which is trouble-free to use and maintain.

A further object is to improve the design and construction of speed-adjusting mechanisms in tractors.

The means by which the foregoing and other objects of the present invention are accomplished and the manner of their accomplishment will be readily understood upon reference to the accompanying drawings in which:

FIG. 1 is an environmental showing of the invention as incorporated in a farm tractor having hydraulically operable transmission means.

FIG. 2 is a partial cross-sectional view of the hydraulic shift valve housing and illustrating the attachment of the invention thereto.

FIG. 3 is a cross sectional view of the head part of the shift selector mechanism.

FIG. 4 is a top view of the head part taken as from FIG. 3.

In the accompanying drawings, the parts are indicated by numerals; the mechanism is indiacted by numeral 11 and is illustrated incorporated in a wheel-type farm tractor 13 having a hydraulic transmission 15 having a shift valve housing 17 mounted on the side of transmission case 19.

Mechanism 11 includes basically a cable and housing assembly indicated by numeral 21, a head assembly 23, and an adaptor assembly 25. Cable 27 and housing 29 extend respectively between head assembly 23 and adaptor assembly 25 and include respectively first and second end portions. Flexible cable 27 includes a first end portion 31 and a second end portion 33; housing 29 includes a flanged first end portion 35 and a flanged second end portion 37. First and second end portions respectively of cable 27 and housing 29 are respectively concentrically arranged with the respective first end portions disposed adjacent head assembly 23 and the respective second end portions disposed adjacent adaptor assembly 25.

Head assembly 23 includes basically a hollow sleeve-like body 39, a barrel member 41 and a handle-pointer member 43. Body 39 is somewhat cylindrical and includes an externally flanged intermediate portion 45 and an internally flanged portion 47 disposed at the lower end portion of body 39. Flanged body portion 47 defines an aperture 49 which securely receives flanged end portion 35 of cable housing 29. Upper and lower oppositely disposed threaded end portions 51, 53 are disposed respectively on opposite sides of flanged portion 45. Barrel member 41 includes an intermediately disposed external flange portion 55 and a lower cylindrical portion 57. The barrel member is turnably mounted in body 39 with the lower surface of flange portion 55 engaging the upper annular surface of body 39 and with the lower end surface of cylindrical barrel portion 57 slidably engaging the flange surface of cable housing portion 35. A disc member 59 having an axially offset internally flanged center portion 61 is threadedly fitted on the upper threaded portion 51 of body 39. The clearance between the respective parts is such that barrel member 41 is freely turnable in body 39 and is held against axial displacement either upwardly or downwardly in body 39. End portion 41 of cable 27 is securely fixed axially in cylindrical portion 57 of barrel member 41. Handle-pointer member 43 includes an integrally formed cup-shaped hub portion 63 and oppositely disposed handle and pointer portions of 65, 67 respectively. Hub portion 63 of member 43 is provided with a square aperture and is securely fitted over the square-shouldered portion 69 of barrel member 41. A washer member 71 having a circular aperture 73 is laminatingly joined to hub portion 63 of handle-pointer member 43. A nut 75 fixedly clamps washer member 71 against square-shouldered portion 69 of barrel member 41 and secures the barrel member and handle-pointer member 43 in fixed relationship. Disc member 59 is provided with concentrically arranged indicia on the upper surface thereof for register with pointer portion 67 of member 43. The indicia, indicated by numeral 77 preferably includes the words "fast," "medium," "slow" arranged clockwise in that order as illustrated in FIG. 4.

Support structure including a plate member 79 securely mounts head assembly 23 on tractor 13. Lower portion 53 of body 39 extends through an aperture 81 in plate member 79. A nut 83 fixedly clamps plate member 79 against flange portion 45 of body 39.

Adaptor assembly 25 includes basically an inner bushing 85, an outer bushing 87 and a bit member 89. Bushings 85, 87 are threadedly secured together and are concentrically fitted on end portion 57 of cable housing 29. Bushings 85, 87 are correspondingly tapered as indicated by numeral 91. The respective tapered portions of bushings 85, 87 are such that cable housing portion 37 may be secured at a desired axial location; contractive movement or relative clockwise movement of bushings 85, 87 constricts the tapered portion of inner bushing 85 around cable housing portion 37 and secures the cable housing at a desired axial location. Outer bushing 87 is threadedly fitted in socket aperture 93 of shift valve housing 17. Bit member 89 is coaxially secured to end portion 33 of cable 27 and projects slightly past the flanged end of housing portion 37. The shift speed adjusting screw 95 is provided with a slotted head portion 97 and the end portion 99 of bit member 89 is correspondingly shaped to fit in adjusting screw head portion 97.

In use, the tractor driver has only to turn clockwise or counter-clockwise on handle member 43 to effect a desired shift speed. Should the tractor be pulling a light load having considerable momentum, the operator will move handle member 43 clockwise for a slow, smooth shifting action. Should the tractor be pulling a heavy, slow-moving load, the operator will move handle member 43 counter-clockwise thereby effecting a rapid and positive shift action.

The shift speed regulating mechanism of the present invention requires only negligible skill or practice to use effectively. Its use results in less wear and considerable savings in maintenance of the tractor machine. The mechanism is of substantially simple design and does not include complicated or intricate parts to malfunction. In summary, the present invention provides a practical mechanism for regulating the speed-of-shift of a tractor.

Although the present invention has been described with reference to a preferred embodiment, it is to be understood that it is not to be so limited since changes and modifications may be made therein which are within the fully intended scope of this invention as hereinafter claimed.

I claim:

1. The combination with a tractor having support structure and a hydraulically shiftable transmission means including a shift speed adjusting screw located at a place on said tractor remote from the operator thereof, of a mechanism for regulating the speed of shift of said transmission comprising a head assembly located on said tractor in proximity to the operator thereof, said head assembly including handle means adapted to be manually turned to a selected position, an adaptor assembly including bit means engaging said shift speed adjusting screw for the turning thereof, and cable means interconnected between said head assembly and said shift speed adjusting screw for turning said screw to a selected position in response to turn of said handle means to a selected position.

2. The combination with a tractor having support structure and hydraulically shiftable transmission means including a shift valve housing having an internally threaded socket aperture and a shift speed adjusting screw threaded in said housing and concentrically arranged in said socket aperture, of a mechanism for regulating the speed of shift of said transmission comprising a head assembly including a body securely fastened to said support structure of said tractor, a barrel member turnably secured in said body, indicia means visually indicating the relative position of said body and said barrel member, and handle means for turnably manipulating said barrel member; an adaptor assembly including bushing means threaded in said shift housing socket aperture and bit means rotatingly interlocked with said shift speed adjusting screw; and a cable and housing assembly operably connecting said head assembly and said adaptor assembly with said cable thereof being securely connected at one end to said barrel member of said head assembly and at the other end thereof to said bit means, and said cable housing being securely connected at one end thereof to said head assembly body and at the other end thereof to said bushing means of said adaptor assembly.

3. The combination with a tractor having support structure and hydraulically operable transmission means including a shift valve housing having a substantially large diametered internally threaded socket aperture and a small diametered shift speed adjusting screw threaded in said housing and concentrically arranged in said socket aperture, of a mechanism for regulating the speed of shift of said transmission comprising a cable and housing assembly including a flexible cable housing having a first end portion and a second end portion, a flexible cable having a first end portion and a second end portion turnably housed in said flexible housing with respective first and second cable and cable housing end portions being respectively concentrically arranged; a head assembly including a sleevelike body, a barrel member turnably secured in said body, means securely connecting said body and said first end portion of said cable housing, means securely connecting said barrel member and said first end portion of said cable, fastening means for securely fastening said body to said support structure of said tractor, a handle fixed to said barrel, a pointer fixed to said barrel, and indicia means in register with said pointer for indicating rotational direction of movement of said handle and a corresponding speed-of-shift function; and an adaptor assembly including bushing means threaded in said shift valve housing socket aperture securely fixing said second end portion of said cable housing to said shift valve housing, and bit means secured on said second end portion of said cable coupling said cable and said shift speed adjusting screw.

4. The combination with a tractor having support structure having an upper and a lower surface and hydraulically operable transmission means including a shift valve housing having a substantially large diametered threaded socket aperture and a substantially small diametered speed of shift adjusting screw threaded in said valve housing and concentrically arranged relative to said aperture socket, of a mechanism for regulating the speed of shift of said transmission comprising a cable assembly including a flexible cable housing having a first end portion and second end portion, a flexible cable having a first end portion and a second end portion turnably housed in said flexible housing with respective first and second cable and cable housing end portions concentrically arranged; a head assembly including a flanged cylindrical barrel fixedly secured on said first end portion of said cable, a hollow cylindrical body member having oppositely disposed externally threaded end portions including an upper end portion and a lower end portion and also including an externally flanged intermediate portion, connecting means securely connecting said first end portion of said cable housing to said body member and with said barrel being turnably supported in said body member, fastening means including a nut for fixedly fastening said body member to said support structure of said tractor with said flanged portion of said body member engaging said support structure upper surface and with said nut threadedly fitted on said lower portion of said body member and engaging said lower surface of said support structure, a disc member having an axially offset internally flanged center portion having an upper surface having circumferentially marked indicia thereon, said disc member being threadedly secured on said upper threaded end portion of said body member with said inwardly flanged portion thereof engaging said externally flanged intermediate portion of said barrel and with said barrel projecting through said inwardly flanged disc member, a handle fixed to said barrel, a pointer fixed to said barrel and correspondingly arranged over said circumferentially marked indicia on said disc member; and an adaptor assembly including bushing means including an outer bushing threadedly fitted in said tractor shift valve housing threaded socket aperture and an inner bushing secured in said outer bushing, said bushing means securing said second end portion of said cable housing to said shift valve housing, and bit means fixedly attached to said second end portion of said cable axially turnably coupling said cable to said shift speed adjusting screw.

References Cited

UNITED STATES PATENTS

| | | | |
|---|---|---|---|
| 1,498,859 | 6/1924 | Wekerle. | |
| 2,017,864 | 10/1935 | Lundegard | 74—471 X |
| 2,078,615 | 4/1937 | Simon | 74—504 X |
| 2,087,205 | 7/1937 | Polete | 74—471 X |
| 2,214,458 | 9/1940 | Glamb | 74—501 X |
| 2,628,588 | 2/1953 | Mehler | 74—553 X |
| 2,801,833 | 8/1957 | Huge | 74—504 X |
| 2,950,794 | 8/1960 | Mayr | 74—471 X |
| 3,205,832 | 9/1965 | Daub | 74—60 X |

FRED C. MATTERN, JR., *Primary Examiner.*

C. F. GREEN, *Assistant Examiner.*